United States Patent Office 3,629,227
Patented Dec. 21, 1971

3,629,227
AZOACYL COMPOUNDS CONTAINING A

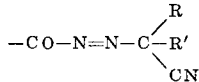

GROUP
Walter Meckel, Dusseldorf, and Erwin Muller, Leverkusen, Germany, assignors to Farbenfabriken Bayer Aktiengesellschaft, Leverkusen, Germany
No Drawing. Filed Sept. 11, 1968, Ser. No. 759,212
Claims priority, application Germany, Sept. 28, 1967,
F 53,613
Int. Cl. C07c 107/00; C09b 27/00
U.S. Cl. 260—174                                            6 Claims

ABSTRACT OF THE DISCLOSURE

Azoacyl compounds having the formula

X—Y wherein Y represents a group of the formula

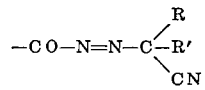

in which R and R′ each individually is alkyl, with the proviso that R and R′ when taken together with the carbon atom to which they are attached, represent a cycloaliphatic radical, and X is selected from the group consisting of alkyl, aryl, substituted aryl which is substituted with 1–2 substituents selected from the group consisting of alkyl, halo and a Y group, aliphatic, such aliphatic which is interrupted by a hetero atom, and such aliphatic which is substituted with a Y group. The azoacyl compounds are useful as blowing agents for foaming plastic materials such as crepe rubber, polyvinyl chloride, and the like.

This invention relates to novel azoacyl compounds and to a process for the preparation thereof.

The present invention provides azoacyl compounds of the formula

X—Y wherein

Y represents a group of the formula

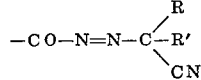

in which

R and R′, which may be the same or different, each represents an alkyl radical or, together with the carbon atom to which they are attached, represent cycloaliphatic radical, and X represents an alkyl or aryl radical, an aryl radical substituted by an alkyl group, a halogen atom or a further Y group, or an aliphatic chain optionally interrupted by a hetero atom and substituted by a further Y group.

The present invention also provides a process for the preparation of these compounds which comprises oxidising a compound of the formula

X′—Y′ wherein Y′ represents a group of the formula

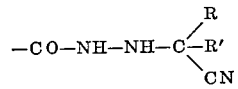

in which R and R′ have the meanings given above and X′ represents an alkyl or aryl radical, an aryl radical substituted by an alkyl group, a halogen atom or a further Y′ group, or an aliphatic chain, optionally interrupted by a hetero atom, and substituted by a further Y′ group, by means of a halogen in aqueous suspension or solution.

When X and X′ represent alkyl radicals, the alkyl radicals in question are preferably lower alkyl radicals containing up to 6 carbon atoms, for example methyl, ethyl, propyl, butyl or hexyl radicals. The aryl radicals are preferably optionally substituted phenyl radicals which may contain lower alkyl radicals or halogen atoms, for example, as substituents, for example phenyl, chlorophenyl, methylphenyl and diethylphenyl. The alkyl or aryl radicals which stand for X and X′, may also be substituted by a radical Y or Y′ respectively. In this case, the alkyl radical which connects the two radicals Y or Y′, may also contain hetero atoms, such as oxygen. The following compounds are examples of starting materials of the formula X′—Y′ that can be used in accordance with the invention to produce the corresponding azoacyl compounds (of Examples 1–7):

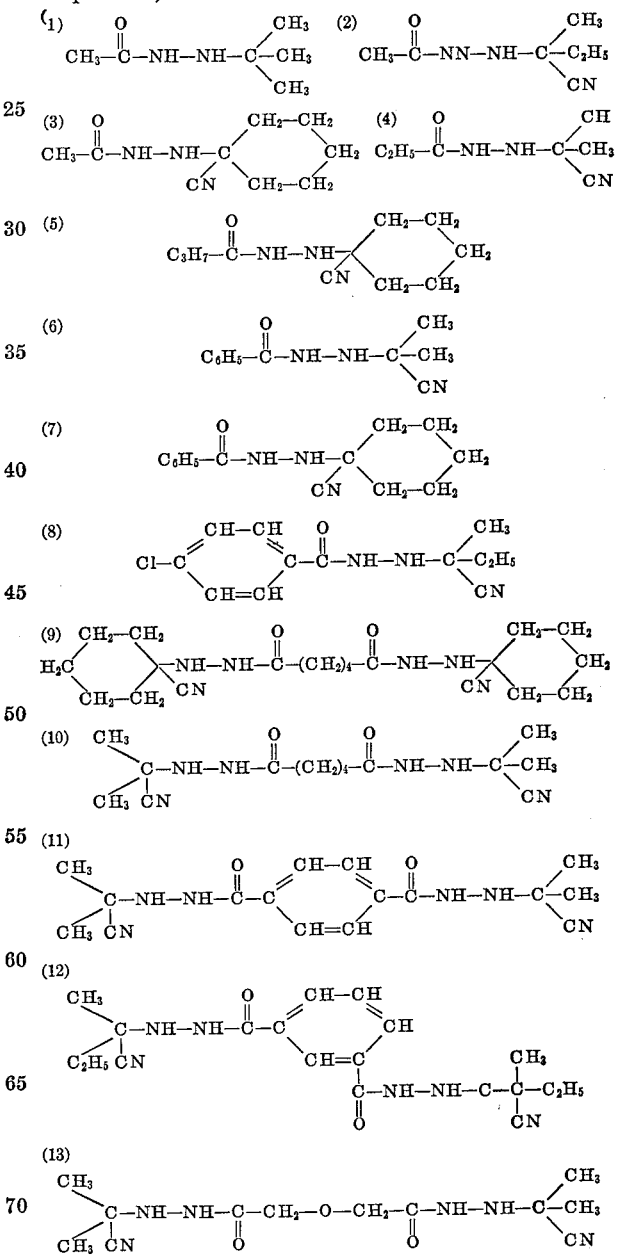

The compounds of the formula X'—Y' used as starting materials in accordance with the invention may be obtained by condensing suitable monoacyl or diacyl hydrazines with cyanhydrins. Condensation takes place at temperatures as low as room temperature by combining the components, optionally in water. Examples of monoacyl and diacyl hydrazines include benzoic acid hydrazide, p-chloro-benzoic acid hydrazide, acetic acid hydrazide, propionic acid hydrazide, butyric acid hydrazide, adipic acid hydrazide, isophthalic acid hydrazide and terephthalic acid hydrazide, whilst examples of suitable cyanhydrins include acetone cyanhydrin, cyclohexanone cyanhydrin, methyl ethyl ketone cyanhydrin, diethyl ketone cyanhydrin and methyl propyl ketone cyanhydrin. The acyl hydrazines are converted into the azoacyl compounds either at room temperature or preferably at somewhat lower temperatures such as for example 0 to 20° C., by introducing the halogens such as chlorine or bromine for example, in the presence of water and optionally in the presence of an inert organic solvent, preferably a hydrocarbon such as benzene or toluene. The azoacyl compounds remain dissolved in the organic phase.

It was surprising that the proces according to the invention could in fact be effectively worked as, according to Houben-Weyl, Methoden der organischen Chemie, vol. X/2, page 807, acyl hydrazines, for example N,N'-diformyl-, N,N'-diacetyl- and N,N'-dibenzoyl hydrazine can only be oxidised into the corresponding azoacyl compounds by the action of oxidising agents, for example bromine or iodine, on the metal compounds of the corresponding N,N'-diacyl hydrazines. Even in this roundabout way, the yields of azoacyl compounds obtained amount to no more than 25 to 35% of the theoretical because some of the N,N'-diacyl hydrazines decompose during oxidation, giving off nitrogen. The resulting azoacyl compounds, for example diformyl or diacetyl diazene, are extremely labile compounds which can only be stored in ethereal solution (Houben-Weyl, Methoden der organischen Chemie, vol. X/2, page 817).

By contrast, the products of the process according to the invention can be obtained in high yields of around 80 to 90% of the theoretical.

Some of the azoacyl compounds according to the invention are in the form of yellow coloured liquids or crystals. They may be used as blowing agents or expanding agents splitting at low temperatures for foaming plastics in the conventional way and in conventional amounts.

The above mentioned labile prior compounds of course could not be so used because of their impractical inherent characteristics.

EXAMPLE 1

(a)

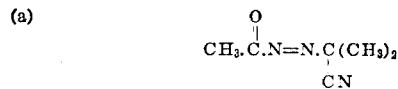

141 g. (1 mol) of the hydrazo compounds obtained in accordance with Example 1b are suspended in 1000 cc. of aqueous benzene. 90 g. (1.28 mols) of chlorine are introduced at 0 to 10° C. When hydrogen chloride ceases to be evolved, the benzene solution is flushed out with nitrogen and shaken with anhydrous sodium carbonate.

Evaporation of the benzene leaves a yellowish-red liquid. Yield: 122 g. (88% of the theoretical).

(b)

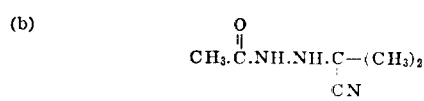

111 g. (1.5 mols) of acetic acid hydrazide are heated for 8 hours at 60° C. with 150 g. (1.77 mols) of acetone cyanhydrin.

Recrystallised from chlorobenzene, the condensation product melts at 83–84° C. Yield 137 g. (65% of theoretical).

EXAMPLE 2

(a)

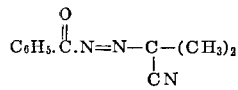

160 g. (0.8 mol) of the hydrazo compounds obtained in accordance with Example 2b are suspended in 300 cc. of water and 1000 cc. of benzene. 72 g. (1.02 mols) of chlorine are introduced at 0–10° C. The benzene solution is washed repeatedly with 10% by weight soda solution. The product is then washed neutral with water, and dried with sodium sulphate and the benzene is distilled off in a water jet vacuum, leaving a yellowish-red oil behind. Yield 150 g. (94% of theoretical).

(b)

$$C_6H_5C.NH.NH.C—(CH_3)_2$$
$$\quad\quad\quad\quad\quad\quad CN$$

272 g. (2 mols) of benzoic acid hydrazide are heated for 5 hours at 60° C. with 220 g. (2.6 mols) of acetone cyanhydrin and 1000 cc. of water. The crystalline deposit is suction-filtered, dried and recrystallised from benzene. Yield: 261 g. (64% of theoretical), M.P. 120–121° C.

EXAMPLE 3

(a)

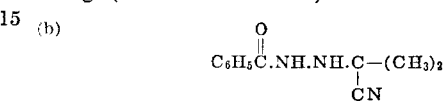

155 g. (0.5 mol) of the hydrazo compound obtained in accordance with Example 3b are suspended in 600 cc. of water and 1000 cc. of benzene. 92 g. (1.3 mols) of chlorine are introduced into the resulting suspension at 0 to 10° C. The benzene solution is washed repeatedly with 10% by weight soda solution and then with water. After drying with sodium sulphate, the benzene is evaporated off in vacuo. The yellow crystalline azo compound melts at 68–69° C. Yield: 126 g. (83% of theoretical).

(b)

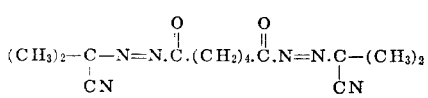

150 g. (0.86 mol) of adipic acid hydrazide are heated for 3 hours at 60° C. with 170 g. (2 mols) of acetone cyanhydrin. After recrystallisation from ethanol, the condensation product melts at 133–134° C. Yield: 200 g. (75% of theoretical).

(c) 100 parts by weight of light crepe, 10.0 parts by weight of zinc white, 3.0 parts by weight of sulphur, 1.5 parts by weight of dibenzothiazyl disulphide, 50.0 parts by weight of chalk, 17.0 parts by weight of mineral oil, 3.0 parts by weight of stearic acid, 2.0 parts by weight of paraffin and 2.6 parts by weight of adipoyl-bis-(2-cyano-prop-2-yl)-diazene, obtained in accordance with Example 3a, are heated at 150° C. in a press. After the press has been opened, an increase in volume of 650% is measured for an average pore size of 2 mm.

EXAMPLE 4

(a)

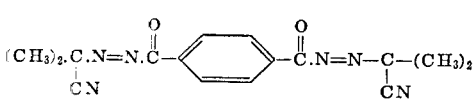

41 g. (0.125 mol) of the hydrazo compound obtained in accordance with Example 4b are suspended in 100 cc. of water and 500 cc. of benzene, and 25 g. (0.35 mol) of chlorine are introduced into the resulting suspension at 0 to 10° C. The benzene solution is washed repeatedly with 10% by weight soda solution and water. After drying with sodium sulphate, the benzene is evaporated off in a water jet vacuum. The crystalline yellow azo compounds melt at 112–113° C. Yield: 34 g. (84% of theoretical).

(b) 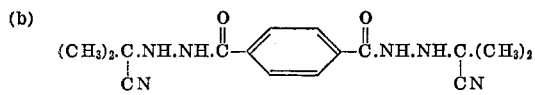

97 g. (0.5 mol) of terephthalic acid dihydrazide are heated for 8 hours at 60° C. with 120 g. (1.4 mols) of acetone cyanhydrin in 100 cc. of water. After recrystallisation from dimethyl formamide/ethanol, the condensation product melts at temperatures above 300° C. Yield: 95 g. (60% of theoretical).

EXAMPLE 5

(a) 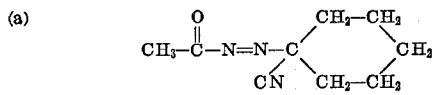

36 g. (0.2 mol) of the hydrazo compound obtained in accordance with Example 5b are suspended in 200 cc. of aqueous benzene, and 16 g. (0.225 mol) of chlorine are introduced into the resulting suspension at 0 to 10° C. After hydrogen chloride ceases to be evolved, the reaction mixture is flushed out with nitrogen. The benzene solution is shaken with anhydrous sodium carbonate and concentrated in vacuo, leaving a yellowish-red oil behind. Yield 35 g. (97% of theoretical).

(b) 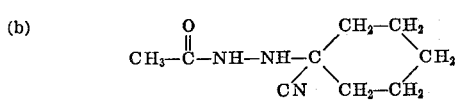

111 g. (1.5 mols) of acetic acid hydrazide are dissolved in 100 ml. of water, and 150 g. of 36% by weight hydrochloric acid are added to the resulting solution with cooling. Following the addition of 147 g. (1.5 mols) of cyclohexanone, 73 g. (1.5 mols) of sodium cyanide in 150 ml. of water are added dropwise with thorough stirring. After 20 hours, the resulting crystal paste is suction-filtered, dried and recrystallised from benzene. Yield: 205 g. (75% of theoretical), M.P. 105–106° C.

EXAMPLE 6

(a) 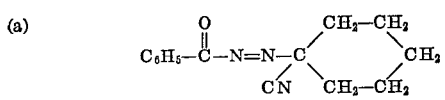

48 g. (0.2 mol) of the hydrazo compound obtained in accordance with Example 6b are suspended in 100 cc. of water and 300 cc. of benzene, and 20 g. (0.285 mol) of chlorine are introduced into the resulting suspension at 0 to 10° C. The benzene solution is washed repeatedly with 10% by weight sodium carbonate solution, washed neutral with water and dried with sodium sulphate. The benzene is evaporated off in vacuo, leaving behind yellowish-red crystals melting at 69–70° C. Yield: 43 g. (90% of theoretical).

(b) 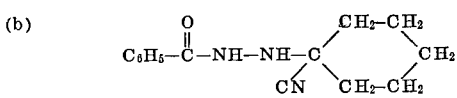

170 g. (1.25 mols) of benzoic acid hydrazide are dissolved in 500 cc. of water, and 125 g. of 36% by weight hydrochloric acid are added to the resulting solution with stirring. Following the addition of 123 g. (1.25 mols) of cyclohexanone, 61 g. (1.25 mols) of sodium cyanide in 250 cc. of water are added dropwise with vigorous stirring. After 20 hours, the deposit is suction-filtered, dried and recrystallised from benzene. Yield: 190 g. (63% of theoretical), M.P. 131–132° C.

EXAMPLE 7

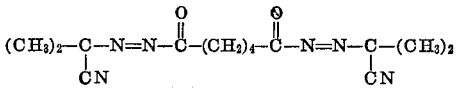

31 g. (0.1 mol) of the hydrazo compound of Example 3b are suspended in 100 cc. of water and 100 cc. of benzene. A solution of 34 g. (0.21 mol) of bromide in 150 cc. of benzene is added dropwise with vigorous stirring at 0 to 10° C. The benzene solution is shaken repeatedly with 10% by weight soda solution, washed neutral and concentrated by evaporation in vacuo. Yellow crystals melting at 68 to 69° C. are left behind. Yield: 9 g. (30% of theoretical).

EXAMPLE 8

A gastight mould (100 x 100 x 10 mm.) is filled with a paste containing an expanding agent, prepared from:

50.0 parts by weight of a PVC-paste, i.e. polyvinylchloride paste,
50.0 parts by weight of dioctyl phthalate,
0.3 part by weight of diphenyl thiourea,
1.0 part by weight of sodium bicarbonate,
10.0 parts by weight of one of the expanding agents mentioned below, followed by heating at 165° C. in a press under a pressure of more than 200 kp./cm.². After 10 minutes, the mould is cooled under pressure to 40° C., opened and the crude block of foam expanded for 30 minutes in a heating cabinet at 100° C., as a result of which the volume of the block increases to about 2.5 times the volume of the mould.

The individual process products gave foams with the following unit weights:

| Foam expanded with product according to Example No.: | Unit weight (kg./m.³) |
|---|---|
| 1a | 184.0 |
| 2a | 128.0 |
| 3a | 97.5 |
| 5a | 122.5 |

EXAMPLE 9

Following the procedure of Example 1 using the corresponding hydrazo compound obtained from propionic acid hydrazide and acetone cyanhydrin, at corresponding molar amounts of the various reactants, the following compound is obtained:

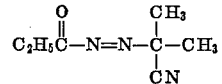

yield 87% of the theoretical: $n_D^{20}$: 1,4327

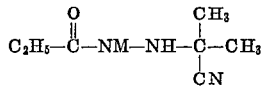

yield 74% of the theoretical M.P. 79–82° C.

In accordance with the various formulae herein,

X represents straight and branched alkyl such as lower alkyl, especially $C_{1-6}$ and more especially $C_{1-4}$ alkyl, including methyl, ethyl, n- and iso-propyl, n-, iso-, sec- and tert-butyl, n- and iso-amyl-, n- and iso-hexyl, and the like;

aryl such as aryl having 6–10 ring carbon atoms, especially phenyl and naphthyl;

substituted aryl such as aryl having 6–10 ring carbon atoms, especially phenyl and naphthyl, which is substituted with alkyl as defined above, especially lower alkyl, and/or a Y group as defined below, and/or halo such as chloro, bromo, fluoro and/or iodo, and particularly 1-2 such alkyl and/or halo and/or Y substituents; or an aliphatic chain, optionally interrupted by a hetero atom and/or optionally substituted with a Y group as defined below, especially lower aliphatic such as $C_{1-6}$ aliphatic and more especially $C_{1-4}$ aliphatic, particularly $C_{1-6}$ or $C_{1-4}$-alkyl or -alkylene, including $C_{2-6}$ or $C_{2-4}$ endo-oxaalkyl or -oxa-alkylene and the corresponding Y group substituted moieties;

Y represents a group of the formula:

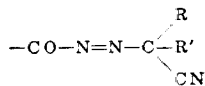

in which R and R' each individually is alkyl as defined above for X, especially $C_{1-6}$ or $C_{1-4}$ alkyl, or when taken together with the carbon atom to which they are attached represent a cycloaliphatic radical, especialy a $C_{5-6}$ cycloaliphatic radical, such as a $C_{5-6}$ cycloalkyl radical, and particularly cyclopentyl, cyclohexyl, and the like;

X' represents a radical as defined above for X, and particularly said alkyl, said aryl, said substituted aryl which is substituted with said alkyl and/or halo substituents and/or a Y' group as defined below, rather than with a Y group, and said aliphatic chain, optionally interrupted by a hetero atom and/or optionally substituted with a Y' group as defined below, rather than with a Y group (the corresponding Y or Y' group being normally provided in X and X' by reason of the use of a 2:1 molar ratio of the starting cyanohydrin to the starting hydrazide, i.e., where a diacyl hydrazide is used); and Y' represents a group of the formula:

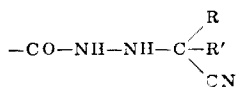

in which R and R' are the same as defined above for Y, and particularly R and R' are lower alkyl or $C_{5-6}$ cycloalkyl.

We claim:

1. Azoacyl compound of the formula

wherein Y represents a group of the formula

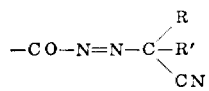

wherein R and R' each individually is $C_{1-4}$ alkyl, with the proviso that R and R' when taken together with the carbon atom to which they are attached represent $C_{5-6}$ cycloalkyl, and X is selected from the group of $C_{1-4}$ alkyl, phenyl, $C_{1-4}$ alkyl-substituted phenyl, chloro-substituted phenyl, phenyl which is substituted with Y, $C_{2-4}$ oxaalkyl, and $C_{1-4}$ alkyl which is substituted with Y.

2. A compound according to claim 1 of the formula:

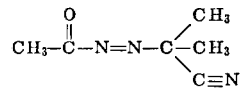

3. A compound according to claim 1 of the formula:

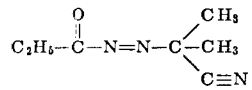

4. A compound according to claim 1 of the formula:

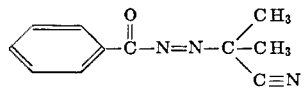

5. A compound according to claim 1 of the formula:

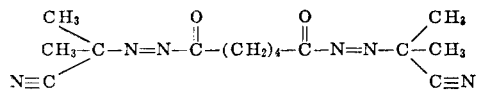

6. A compound according to claim 1 of the formula:

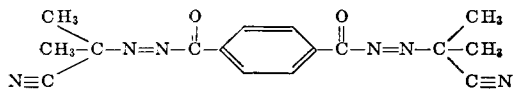

References Cited

UNITED STATES PATENTS

| | | | |
|---|---|---|---|
| 2,520,338 | 8/1950 | Robertson | 260—192 |
| 2,605,260 | 7/1952 | Johnson | 260—192 X |
| 2,744,105 | 5/1956 | Barney | 260—192 X |
| 2,778,818 | 1/1957 | Hyson et al. | 260—192 |
| 3,225,026 | 12/1965 | Huibers et al. | 260—192 |
| 3,244,692 | 4/1966 | Ham | 260—192 X |
| 3,250,800 | 5/1966 | Godfrey | 260—192 X |
| 3,306,862 | 2/1967 | Mageli et al. | 260—192 X |
| 3,474,085 | 10/1969 | MacLeay et al. | 260—192 |
| 3,491,084 | 1/1970 | Huenig et al. | 260—192 |

OTHER REFERENCES

Bock: Ber. Deut. Chem., vol. 99, pp. 3337 to 3349 (1966).

Houben-Weyl: "Methoden der Organischen Chemie," vol. 10–2, pp. 807 to 809 (1967).

FLOYD D. HIGEL, Primary Examiner

U.S. Cl. X.R.

106—122; 252—350; 260—192, 464, 465, 465.4

UNITED STATES PATENT OFFICE
CERTIFICATE OF CORRECTION

Patent No. 3,629,227                    Dated December 21, 1972

Inventor(s) Walter Meckel and Erwin Muller

It is certified that error appears in the above-identified patent and that said Letters Patent are hereby corrected as shown below:

Column 2, line 21, formula (1) should read

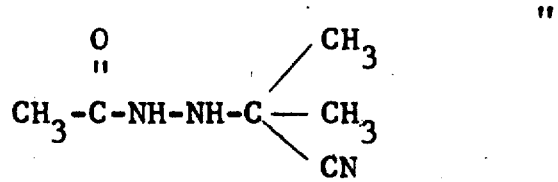

Column 6, line 8, "bromide" should read "bromine"

Signed and sealed this 6th day of June 1972.

(SEAL)
Attest:

EDWARD M. FLETCHER, JR.
Attesting Officer

ROBERT GOTTSCHALK
Commissioner of Patents